United States Patent [19]

Ishii

[11] Patent Number: 5,500,772
[45] Date of Patent: Mar. 19, 1996

[54] LENS BARREL FOR DIFFERENT KINDS OF TV CAMERAS

[75] Inventor: Tadayoshi Ishii, Tokyo, Japan

[73] Assignee: Asahi Seimitsu Kabushiki Kaisha, Tokyo, Japan

[21] Appl. No.: 267,937

[22] Filed: Jul. 6, 1994

[30] Foreign Application Priority Data

Jul. 9, 1993 [JP] Japan .................................. 5-170625

[51] Int. Cl.⁶ .................................................. G02B 7/02
[52] U.S. Cl. ...................... 359/822; 359/694; 354/195.12
[58] Field of Search ...................... 359/822, 823, 359/824, 827, 694, 695, 696, 704; 354/195.12, 400; 250/201.2, 201.4

[56] References Cited

U.S. PATENT DOCUMENTS 4,413,894  11/1983  Miki et al. .......................... 359/827
4,416,526  11/1983  Iomori et al. ...................... 354/195.12
4,974,949  12/1990  Tanaka .................................. 359/704

*Primary Examiner*—Loha Ben
*Attorney, Agent, or Firm*—Greenblum & Bernstein

[57] ABSTRACT

A common lens barrel can be detachably attached to a plurality of TV camera bodies each having at least one filter provided in front of an image pickup device. The filters of the respective camera bodies have different thicknesses, and the common lens barrel has a plurality of lens groups. The lens barrel includes a focusing mechanisms and a mechanism for varying a distance between specific lens groups of the plurality of lens groups in accordance with the thickness of the filter of the camera body to which the common lens barrel is attached.

17 Claims, 15 Drawing Sheets

Spherical Aberration

Spherical Aberration

LENS BARREL FOR DIFFERENT KINDS OF TV CAMERAS

BACKGROUND OF THE INVENTION

1. Field of the Invention

The present invention relates to a lens barrel which can be commonly used with different kinds of TV cameras having filters of different thickness provided in front of an image pickup device.

2. Description of Related Art

There are two kinds of TV camera bodies, one for a monochrome TV and one for a color TV. The camera bodies for the monochrome TV and the color TV are provided with different light receiving elements and different filters, having different refractive indexes and/or thicknesses and provided in front of the respective light receiving elements. In the monochrome TV camera body, a glass cover for the light receiving element is used as a filter whose thickness is about 0.8 to 1.2 mm. On the other hand, in the color TV camera body, a low-pass filter is provided in addition to the glass cover. The low-pass filter is usually made of a laminated composite of a crystal birefringent plate and an infrared filter, and accordingly has a thickness of about 5 to 6 mm. In general, the filters are provided on the camera side, and accordingly, there is a difference of 4 to 5 mm in thickness between the monochrome TV camera body and the color TV camera body.

In order to absorb the difference in thickness to thereby make it possible to commonly use a lens barrel (referred to as a common lens barrel) for both the monochrome TV camera body and the color TV camera body, the monochrome TV camera body and the color TV camera body have different flange-focal distances, so that an object image can be formed on the respective image pickup devices. However, the color image and the monochrome image to be formed have different aberrations that must be eliminated in the common lens barrel. Among the aberrations, the spherical aberration is considered most important, since the spherical aberration varies depending on the difference in thickness of the filters, thus resulting in an adverse influence on the image quality on the image surface. To this end, in conventional common lens barrels, the main solution has been directed towards elimination of the spherical aberration, taking into account a balance between the monochrome TV camera and the color TV camera, so that the image quality is not influenced much by the spherical aberration. Namely, in designing an optical system of the common lens barrel, the filter thickness is assumed to be an intermediate value between the thickness of the filters of the monochrome TV camera body and the thickness of the filters of the color TV camera body, so that a positive spherical aberration and a negative spherical aberration occur at the formation of a color image and a monochrome image, respectively. However, this is not the best solution, since an optimal visual position inherent in the lens is not used. In particular, for a high resolution camera or a high definition TV in which the resolution and brightness of the lens must be increased, the optical efficiency of the conventional common lens barrel is too poor to satisfactorily increase the resolution and brightness of the lens. To solve this problem, there have been attempts to produce separate lens barrels for the color TV camera body and the monochrome TV camera body, respectively. To make it possible to apply a lens barrel which has been designed to suit a color TV camera body to a monochrome TV camera body, it is also known to attach a filter to the rear end of the lens barrel to absorb the difference in thickness of the filter(s) between the color TV camera body and the monochrome TV camera body, to thereby compensate for the aberrations. However, these solutions invite an increase in the number of components, thus resulting in an increase of the manufacturing cost and an uneasy operation of the lens barrel.

Moreover, in a fast lens having an f-number of F0.7 to F0.8, the difference in thickness of the filters between the TV camera bodies is serious, since the image quality is largely influenced even by a small difference of about 0.5 mm in the filter thickness. In general, the color TV camera bodies produced by different manufacturers have different filter thicknesses.

SUMMARY OF THE INVENTION

The primary object of the present invention is to provide a lens barrel which can be commonly used for different kinds of TV camera bodies having different thicknesses of filters, wherein various aberrations can be appropriately corrected in a color image or a monochrome image.

The basic concept of the present invention resides in the provision of a switching mechanism for varying the position of the optical system of the lens barrel, in accordance with the thickness of the filter provided in front of the image pickup device, in addition to a focusing mechanism.

To achieve the object mentioned above, according to an aspect of the present invention, a common lens barrel is provided which can be detachably attached to a plurality of TV camera bodies each having at least one filter provided in front of an image pickup device; the filters of the respective camera bodies have different thicknesses, and the common lens barrel has a plurality of lens groups. The lens barrel includes a focusing mechanism and a mechanism for varying a distance between specific lens groups of the plurality of lens groups in accordance with the thickness of the filter of the camera body to which the common lens barrel is attached.

In the present invention, there is no limit to the number of the lenses or lens groups which make up the lens barrel, but the lens system is preferably comprised of two or three lens groups.

If the lens groups are comprised of three lens groups consisting of a first lens group, a second lens group and a third lens group, the focusing mechanism moves the entirety of the three lens groups in the optical axis direction, and the switching mechanism moves the first and second lens groups together with respect to the third lens group. In the case that the above plurality of TV camera bodies include a monochrome TV camera body and a color TV camera body, the switching mechanism moves the first and second lens groups in unison closer towards the third lens group when the common lens barrel is attached to the color TV camera body than when the common lens barrel is attached to the monochrome TV camera body.

With this arrangement, the aberrations, and particularly the spherical aberration, can be properly corrected in both the color image and the monochrome image.

In another embodiment, the switching mechanism varies the distance between the first and second lens groups and the distance between the second and third lens groups, respectively. In this alternative, the switching mechanism moves the first lens group closer towards the second lens group when the common lens barrel is attached to the monochrome TV camera body than when the common lens barrel is attached to the color TV camera body, and moves the second lens group closer towards the third lens group when the common lens barrel is attached to the color TV camera body than when the common lens barrel is attached to the monochrome TV camera body.

With this arrangement, the aberrations, and particularly the spherical aberration, can be correctly compensated in both the color image and the monochrome image. Moreover, it has been found that in a specific lens system, the displacement of the first lens group towards the second lens group is preferably larger than the displacement of the second lens group towards the third lens group.

If the plurality of lens groups consist of a front lens group and a rear lens group, the focusing mechanism moves the front and rear lens groups together in the optical axis direction, and the switching mechanism individually moves the front lens group and the rear lens group along predetermined loci.

According to another aspect of the present invention, there is provided a common lens barrel which can be detachably attached to a plurality of TV camera bodies each having a filter provided in front of an image pickup device, wherein the filters of the respective camera bodies have different thicknesses, and wherein the common lens barrel has a plurality of lens groups. The lens barrel includes a focusing mechanism and a switching mechanism for moving the plurality of lens groups to a predetermined position in the optical axis direction in accordance with the thickness of the filter of the camera body to which the lens barrel is attached, independently of the focusing mechanism.

The present disclosure relates to subject matter contained in Japanese patent application No. 5-170625 (filed on Jul. 9, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
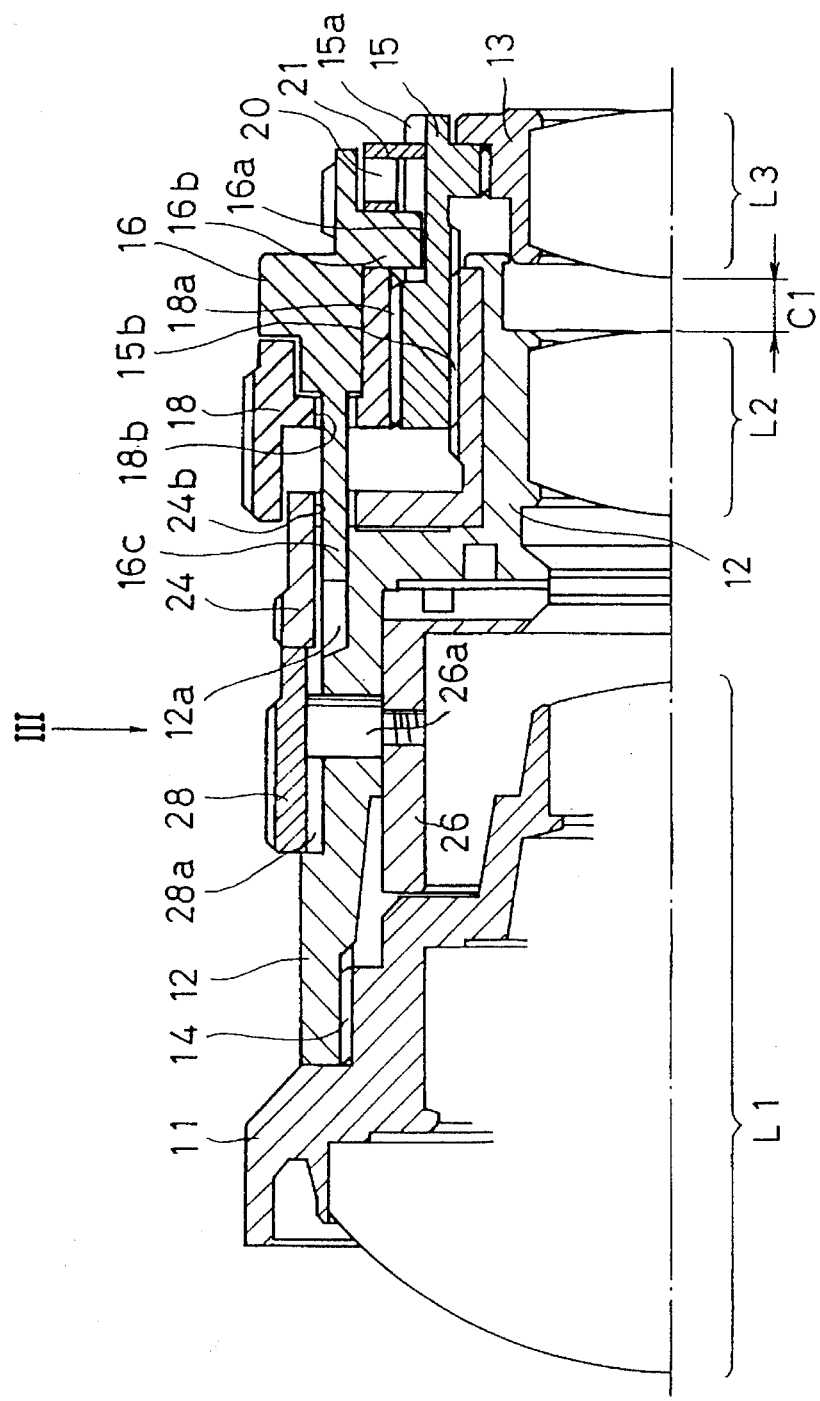
FIG. 1 is a longitudinal sectional view of an upper half of a common lens barrel, which can be used with different kinds of TV cameras, showing lens group positions when attached to a monochrome TV camera body according to a first embodiment of the present invention.
Figure 2:
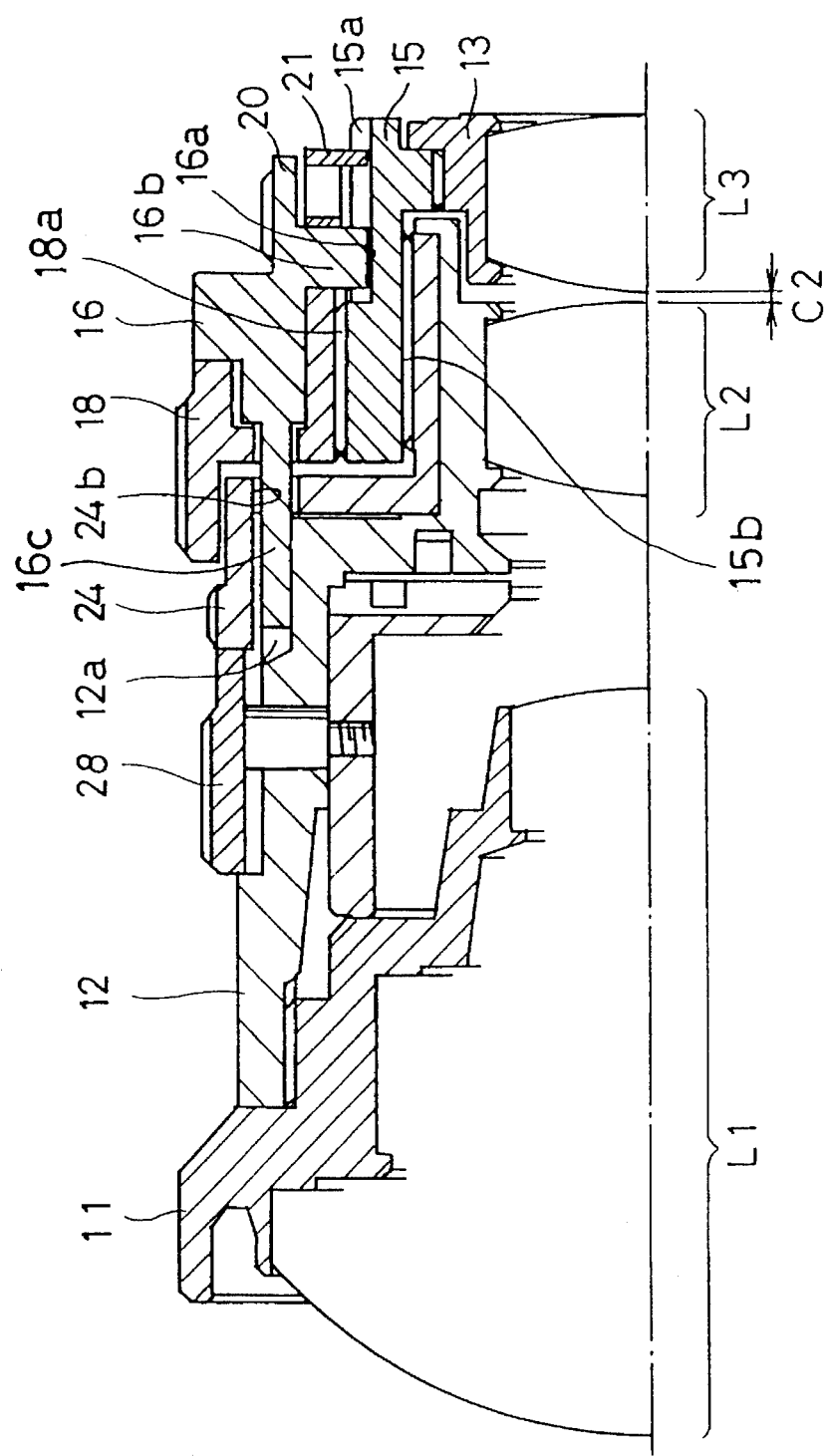
FIG. 2 is a longitudinal sectional view of an upper half of a common lens barrel, which can be used with different kinds of TV cameras, showing lens group positions when attached to a color TV camera body according to a first embodiment of the present invention.
Figure 3:
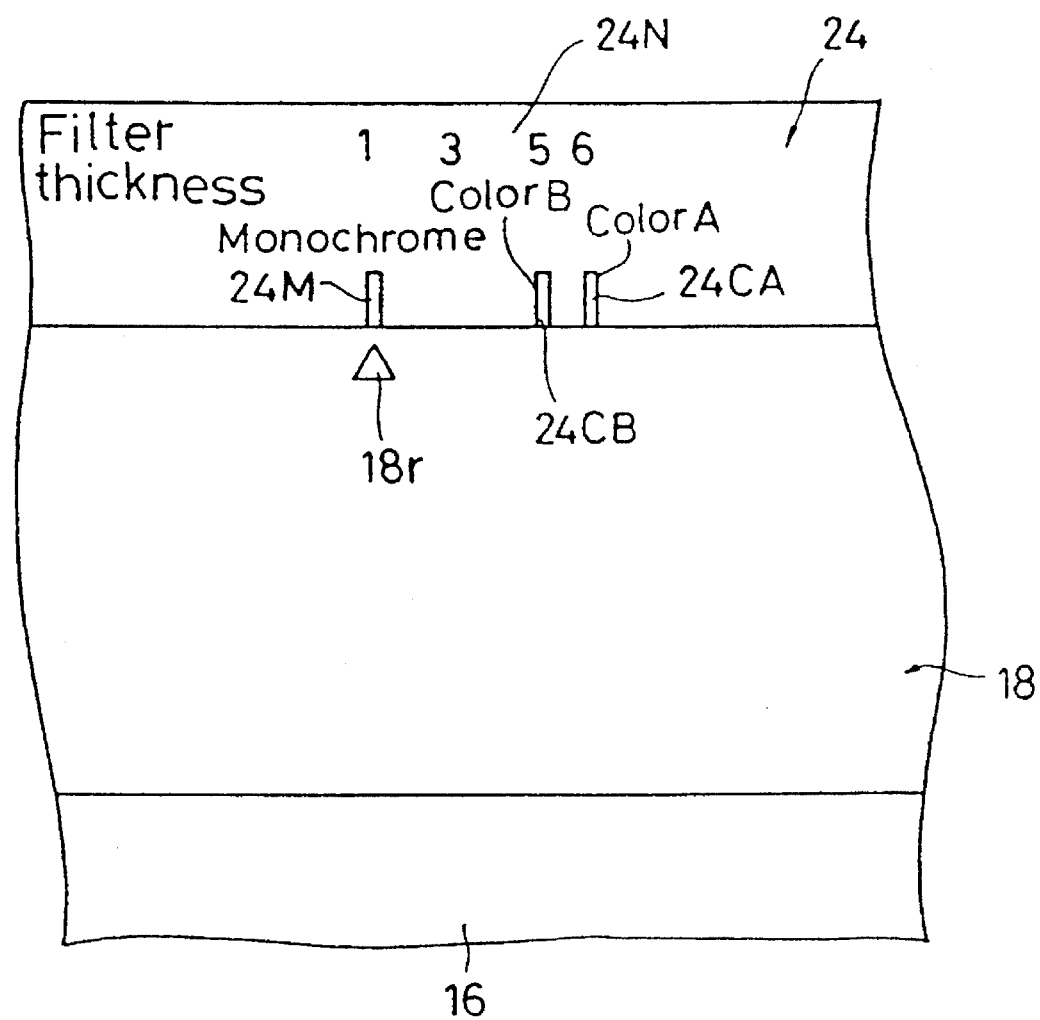
FIG. 3 is a developed view of a common lens barrel, as viewed from the direction indicated at III in FIG. 1.

FIGS. 1 through 3 show a first embodiment of the present invention. A common lens barrel according to the present invention is comprised of three lens groups consisting of a first lens group L1, a second lens group L2, and a third lens group L3. The first, second and third lens groups L1, L2 and L3 are secured to first, second and third lens frames 11, 12 and 13, respectively. The second lens frame 12 is screw-engaged at the front end thereof by the first lens frame 11, so that the second lens frame 12 and the first lens frame 11 (i.e., first lens group L1 and second lens group L2) can be moved together.

The third lens frame 13 is screw-engaged by a connecting ring (i.e., linear movement transmitting ring) 15 which is supported in a linearly movable manner by a lens mounting ring 16 which is mounted to a body mount of a TV camera. Namely, the lens mount (i.e., ring) 16 is provided with a radial projection 16a which is fitted in a corresponding linear movement guide groove 15a formed in the connecting ring 15 and extending parallel with the optical axis of the lens barrel.

The connecting ring 15 is threadedly-engaged by a focusing ring 18 which is rotatably supported by the lens mount 16 through a threaded portion 18a. The connecting ring 15 and the focusing ring 18 are continuously biased rearwardly (i.e., to the right in FIG. 1) by an annular leaf spring 20. Namely, the annular leaf spring 20 is inserted between a flange 16b of the lens mount 16 and an annular spring seat 21 secured to the connecting ring 15 to bias the connecting ring 15 rearwardly. Consequently, the focusing ring 18 which is threadedly-engaged by the connecting ring 15 is also biased rearwardly. The focusing ring 18 can be rotated about the optical axis at a rearmost position thereof (i.e., at a position most retracted with respect to the lens mount 16).

The second lens frame 12 is provided on the outer peripheral surface thereof with a rotatable switching ring (i.e., selection ring) 24 which is linearly movable in the optical axis direction together with the second lens frame 12 and which is actuated to switch between TV mode, a color a monochrome TV mode and a plurality of color TV modes. The switching ring 24 is threadedly-engaged on an inner peripheral surface of the connecting ring 15 through a threaded portion 15b thereof. The second lens frame 12 is provided with a linear guide groove 12a parallel with the optical axis, in which a linear movement guide bar 16c projecting from the lens mount 16 is fitted. Consequently, when the switching ring 24 is rotated, the screw engagement position thereof relative to the connecting ring 15, which does not rotate, changes, so that the switching ring 24 moves in the axial direction while rotating.

The switching ring 24 causes the second lens frame 12 to move together therewith in the optical axis direction. As a result, the first and second lens groups L1 and L2, supported by the second lens frame 12, are moved together in the optical axis direction by the rotation of the switching ring 24. The focusing ring 18 and the switching ring 24 are provided with circumferential grooves 18b and 24b, respectively, in which the linear movement guide bar 16c is fitted.

A diaphragm actuating (i.e., opening and closing) ring 26 and a diaphragm scale ring 28 are rotatably fitted on the inner and outer peripheral surfaces of the second lens frame 12, respectively. The diaphragm actuating ring 26 and the diaphragm scale ring 28 are connected to each other through a radial pin 26a and an axial groove 28a so as to rotate by an equiangular displacements. When the diaphragm actuating ring 26 is rotated, the aperture (i.e., diaphragm) varies through a diaphragm control mechanism per se known.

As mentioned above, the switching ring 24 is actuated to select a color TV mode, a monochrome TV mode and two color TV modes "A" and "B". In the illustrated embodiment, the thickness of the filter located in front of the image pickup device is, for example, 1 mm for a monochrome TV mode, 6 mm for a color TV mode "A", and 5 mm for a color TV mode "B", respectively.

FIG. 3 shows a developed view of the switching ring 24 and the surroundings thereof. The switching ring 24 is provided with marks 24M (monochrome), 24CA (color A) and 24CB (color B) which are selectively registered with a reference mark 18r provided on the focusing ring 18 to select the monochrome TV mode, the color TV mode A, and the color TV mode B by the rotation of the switching ring 24.

Further, it is possible to provide filter thickness marks (numerals) 24N, in addition to, or instead of the marks 24M, 24CA and 24CB.

In the common lens barrel as constructed above, when the focusing ring 18 is rotated in a monochrome TV mode shown in FIG. 1 or a color TV mode "A" shown in FIG. 2, the connecting ring 15 which is movably guided in a linear manner by the lens mount 16 is moved in the optical axis direction through the threaded portion 18a. Since the first, second and third lens groups L1, L2 and L3 are supported by the connecting ring 15, the rotation of the focusing ring 18 causes the whole lens system to move in the optical axis direction to carry out the focusing operation. The adjustment of the back-focal distance can also be effected.

As mentioned above, when the rotation of the switching ring 24 occurs, the threaded-engagement position thereof relative to the connecting ring 15 varies through the threaded portion 15b, so that the switching ring 24 moves in the axial direction. Since the switching ring 24 moves the second lens frame 12, which directly or indirectly supports the first and second lens groups L1 and L2, in the axial direction, the distance between the first and second lens groups L1 and L2 and the third lens group L3 changes. It is apparent that the distance C1 between the second lens group L2 and the third lens group L3 shown in FIG. 1 is larger than the corresponding distance C2 shown in FIG. 2. Hence, when the switching ring 24 is rotated, in the monochrome TV mode shown in FIG. 1 to move the first and second lens groups L1 and L2 as a pair towards the third lens group L3, a color TV mode "A" is selected, as shown in FIG. 2. Thus, a lens system, in which the various aberrations have been eliminated for the color image, can be obtained. A further rotation of the switching ring 24 causes the first and second lens groups L1 and L2 to come closer to the third lens group L3 in order to obtain the color TV mode "B".

As can be seen from the above discussion, the switching ring 24 selectively occupies the color TV mode "A", the color TV mode "B", and the monochrome TV mode. It is possible to provide a detector (not shown) which detects the angular position of the switching ring 24. The detector can be associated with a warning means (not shown), so that if the switching ring 24 is in an angular position other than the angular positions corresponding to the color TV mode "A", the color TV mode "B" and the monochrome TV mode, the warning means is activated. Moreover, it is also possible to provide a prohibiting means for automatically prohibiting photographing in accordance with a detection signal of the detector.

Furthermore, it is possible to provide a signal-transmitting-and-receiving means between the common lens barrel and the color TV camera body or the monochrome TV camera body, in order to actuate the warning means or prohibiting means when the switching ring 24 is located at an incorrect position. For example, if the switching ring 24 is not located at the color TV mode when the common lens barrel is attached to the color TV camera body, or conversely, if the switching ring 24 is not located at the monochrome TV mode when the common lens barrel is attached to the monochrome TV camera body, the warning means and/or the prohibiting means are actuated to warn of the incorrect position or to prohibit photographing.

Although the above mentioned explanation is directed to a case in which the switching ring 24 is rotated to switch the position of the lenses to concur with three different TV camera bodies, it is apparent that the adjustment by rotation of the switching ring 24 is or can be made stepless (i.e., the movement of the lenses is or can be continuous). Therefore, the present invention is capable of being applied to more than three different TV camera bodies having different filter thicknesses.

Figure 4:
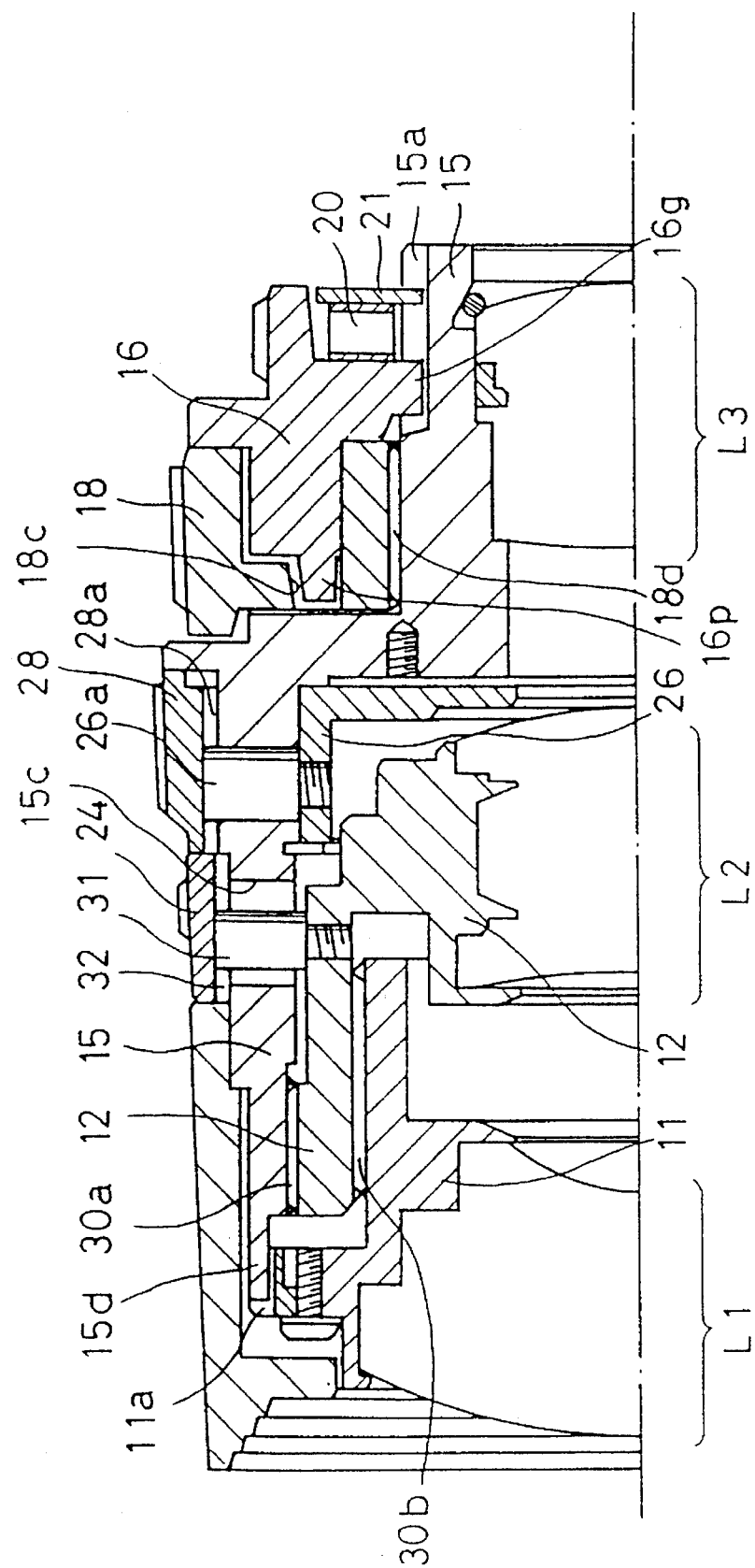
FIG. 4 is a longitudinal sectional view of an upper half of a common lens barrel, which can be used with different kinds of TV cameras, showing lens group positions when attached to a monochrome TV camera body according to a second embodiment of the present invention.
Figure 5:
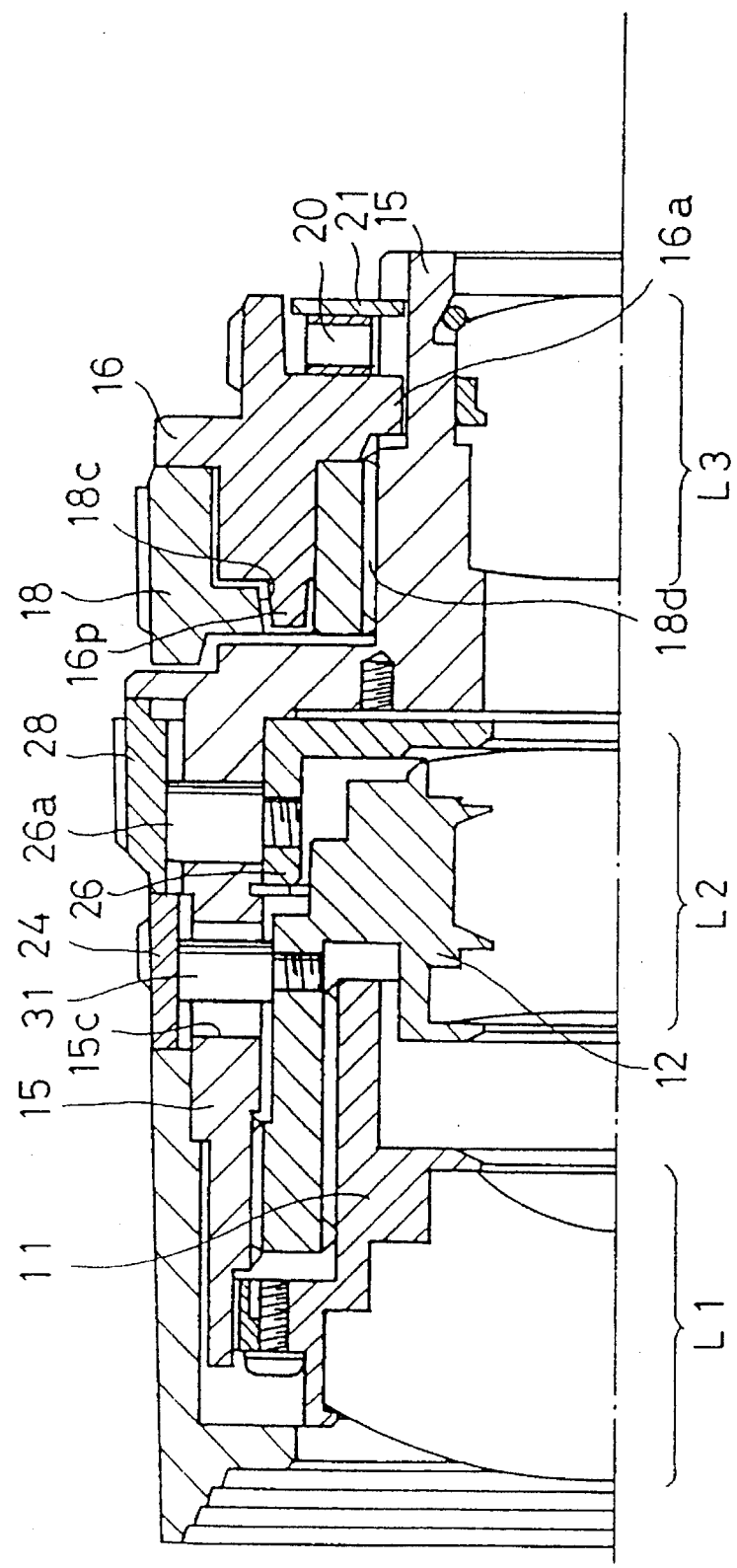
FIG. 5 is a longitudinal sectional view of an upper half of a common lens barrel, when used with different kinds of TV cameras, showing lens group positions when a switching means is actuated while the lens barrel is attached to a color TV camera body, according to a second embodiment of the present invention.

FIGS. 4 and 5 show a second embodiment of the present invention, applied to a lens system having three lens groups. In this embodiment, the first and second lens groups L1 and L2 are individually moved towards the third lens group L3 to switch from the color TV mode to the monochrome TV mode or vice versa. In FIGS. 4 and 5, the components corresponding to those in the first embodiment shown in FIGS. 1 and 2 are designated with like reference numerals.

The focusing ring 18 is rotatably supported by the lens mount (i.e., ring) 16 through the leaf spring 20 and the annular spring seat 21, similar to the first embodiment. The angular displacement of the focusing ring 18 is restricted by a circumferentially elongated hole 18c formed in the focusing ring 18 and a pin 16p projecting from the lens mount 16.

The focusing ring 18 is threadedly-engaged by the connecting ring 15 through the threaded portion 18d. The connecting ring 15 is linearly movable in the optical axis direction through the engagement of the linear movement guide projection 16g and the linear movement guide groove 15a so as not to rotate.

The second lens frame 12 is engaged by the inner peripheral surface of the connecting ring 15 through the threaded portion 30a, and the first lens frame 11 is engaged by the inner peripheral surface of the second lens frame 12 through another threaded portion 30b. Moreover, the first lens frame 11 is provided with a linear movement guide groove 11a in parallel with the optical axis, in which the linear guide pin 15d provided on the connecting ring 15 is fitted. Since the connecting ring 15 is guided to linearly move, the first lens frame 11 is also moved to linearly move in the same direction.

The radial pin 31 provided on the second lens frame 12 extends through the elongated hole 15c of the connecting ring 15 and is fitted in the axially extending linear groove 32 formed in the switching ring 24, so that the switching ring 24 and the second lens frame 12 can be rotated by equal angular displacements.

In the illustrated embodiment, the threaded portions 30a and 30b have opposite thread directions, and the pitch of the threaded portion 30b is twice the pitch of the threaded portion 30a.

In the common lens barrel as constructed above, when the focusing ring 18 is rotated in a monochrome TV mode shown in FIG. 4 or a color TV mode "A" shown in FIG. 5, the connecting ring 15, which is linearly movably guided by the lens mount 16, is moved in the optical axis direction through the threaded portion 18d. Since the first, second and third lens groups L1, L2 and L3 are supported by the connecting ring 15, the rotation of the focusing ring 18 causes the whole lens system to move in the optical axis direction to carry out the focusing. The developed view of the connecting ring 24 and the surroundings thereof is the same as FIG. 3.

When the rotation of the switching ring 24 occurs, the rotation of the second lens frame 12 takes place through the axial groove 32 and the radial pin 31. Since the second lens frame 12 threadedly-engages with the connecting ring 15 and the first lens frame 11 through the threaded portions 30a and 30b, respectively, and since the connecting ring 15 and the first lens frame 11 are prevented from being rotated, the second lens frame 12 and the first lens frame 11 are respectively moved in the optical axis direction relative to the connecting ring 15 which does not move in the same direction when the second lens frame 12 is rotated. Namely, the second lens frame 12 moves in the optical axis direction while rotating, and the first lens frame 11 moves in the optical axis direction without rotating, respectively. The directions and pitches of the threaded portions 30a and 30b are determined such that when the first lens frame 11 (i.e., first lens group L1) is moved rearwardly by the displacement "1", the second lens frame 12 (i.e., second lens group L2) is moved in the same direction by a displacement "0.5", upon switching from the monochrome TV mode to the color TV mode "A" or "B". In the illustrated embodiment, when the TV mode is switched from the monochrome TV mode to the color TV mode "A" by the switching ring 24, the first lens group L1 and the second lens group L2 are moved rearwardly by 0.8 mm and 0.4 mm, respectively.

Figure 6:
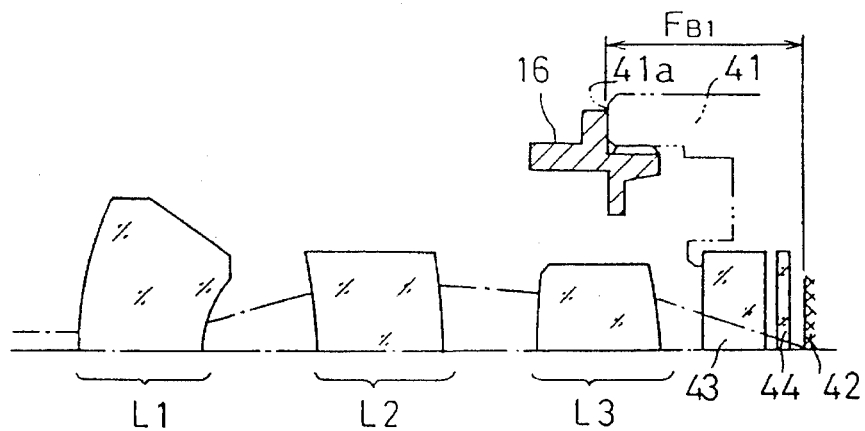
FIG. 6 is a schematic view of an upper half of an optical system of the common lens barrel shown in FIG. 4 when a switching means is switched to a color TV position while the lens barrel is attached to a color TV camera body.

FIG. 6 shows the common lens barrel, which is shown in FIGS. 4 and 5, attached to a color TV body mount 41 for the color TV mode "A". The body mount 41 is provided therein with an image pickup device 42 for a color TV. A low-pass filter 43 and a glass cover 44 are provided in front of the image pickup device 42. The flange-focal distance $F_{B1}$ of the color TV body is defined by the distance between the image pickup device 42 and the mount surface 41a of the body mount 41. The spherical aberration at a specific wavelength in the state shown in FIG. 6 is indicated by a solid line A in FIG. 9.

Figure 7:
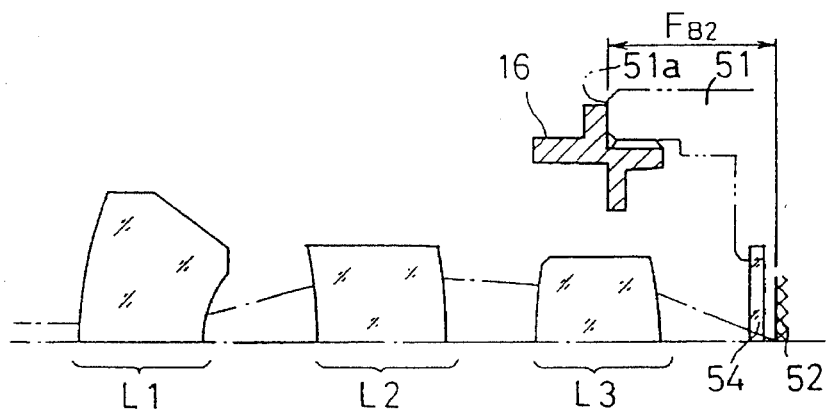
FIG. 7 is a schematic view of an upper half of an optical system of the common lens barrel shown in FIG. 4 when attached to a monochrome TV camera body without the switching means being actuated.
Figure 8:
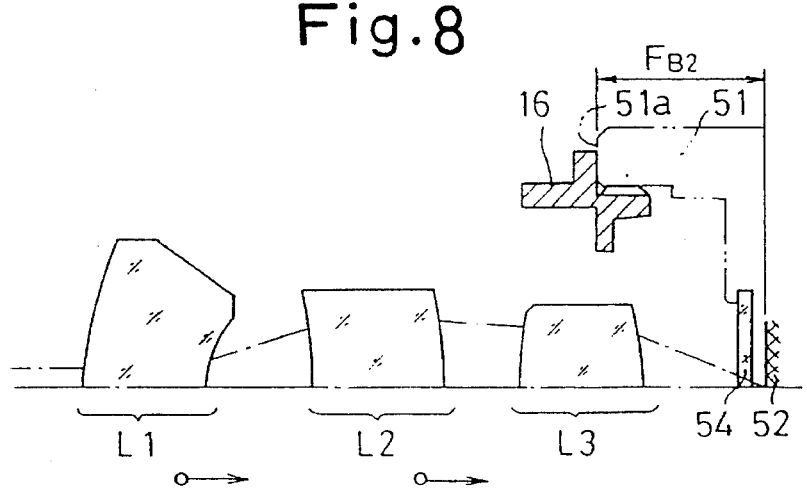
FIG. 8 is a schematic view of an upper half of an optical system of the common lens barrel shown in FIG. 4 when a switching means is actuated while the lens barrel is attached to a monochrome TV camera body.

FIGS. 7 and 8 shows the common lens barrel, shown in FIGS. 4 and 5, attached to a monochrome TV body mount 51 for the monochrome TV mode. In FIG. 7, no mode switching operation is effected, and in FIG. 8, the switching operation is carried out by the switching ring 24, respectively. In FIG. 7, the body mount 51 is provided therein with an image pickup device 52 for a monochrome TV. A glass cover 54 is provided in front of the image pickup device 52. The flange-focal distance $F_{B2}$ of the monochrome TV body is defined by the distance between the image pickup device 52 and the mount surface 51a of the body mount 51. Here, the flange-focal distance $F_{B1}$ is larger than the flange-focal distance $F_{B2}$ ($F_{B2} < F_{B1}$).

Figure 9:
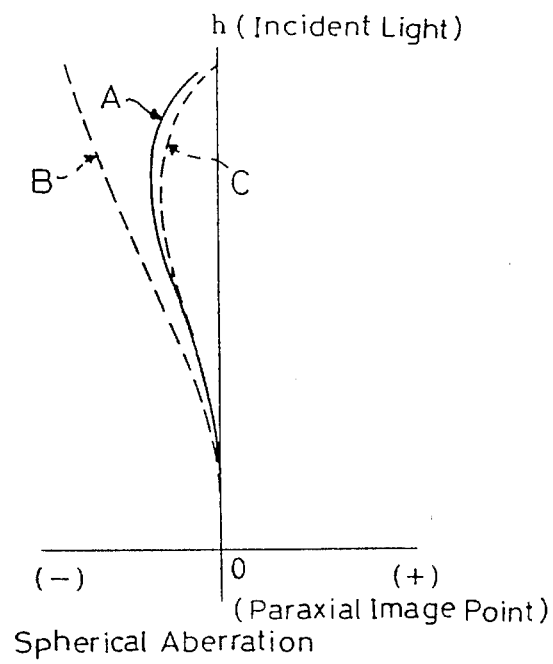
FIG. 9 is a diagram of spherical aberrations caused in a lens system shown in FIGS. 5, 6 and 7.

The spherical aberrations at a specific wavelength in the state shown in FIGS. 7 and 8 are indicated by phantom lines B and C in FIG. 9, respectively.

When the mode is not switched to the monochrome TV mode by the switching ring 24, the spherical aberration increases in the minus (i.e., negative) direction with respect to the paraxial image point, as shown by the phantom line B. On the other hand, when the mode is switched to the monochrome TV mode by the switching ring 24, so that the first and second lens groups L1 and L2 are moved towards the third lens group L3, the spherical aberration indicated at the phantom line C in FIG. 9 is compensated to be identical to or better than the solid line A.

Figure 10:
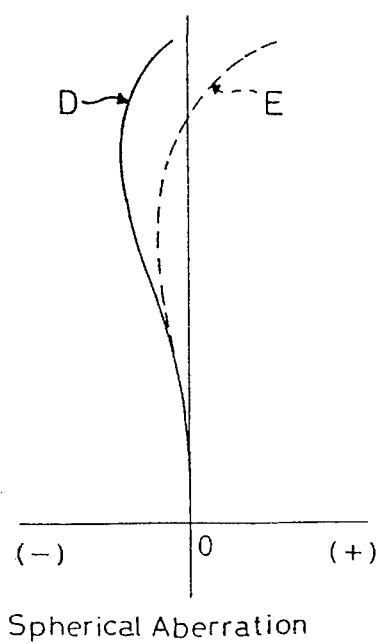
FIG. 10 is a diagram of spherical aberrations when a lens whose spherical aberration is compensated to suit a monochrome TV is attached to a color TV camera body.

Although no aberration for the first embodiment illustrated in FIGS. 1 and 2 is shown in the drawings, the tendency of the aberrations (or compensation of the aberrations) is the same as that shown in FIGS. 9 and 10.

The spherical aberration which has been compensated for a monochrome TV lens is indicated as a solid line D in FIG.

10, by way of example. If the monochrome TV lens is attached to the color TV camera body to take a color image, the spherical aberration increases in the positive (plus) direction with respect to the paraxial image point, as indicated by a phantom line E. To prevent such an extreme change of the spherical aberration from occurring between the color image and the monochrome image, the switching ring 24 is actuated to switch the mode according to the present invention.

The following discussion will be directed to different embodiments (third through sixth embodiments) applied to a lens system consisting of a front lens group and a rear lens group (FIGS. 11 through 21).

Figure 11:
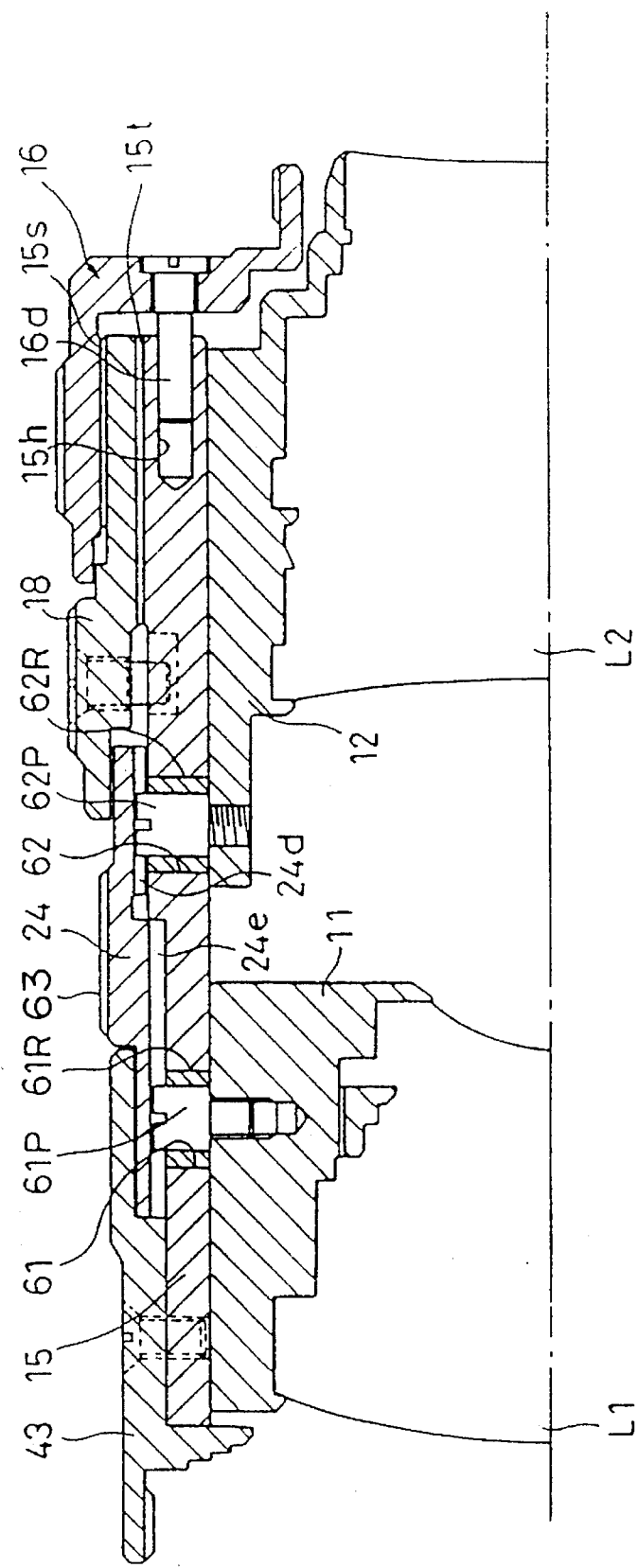
FIG. 11 is a longitudinal sectional view of an upper half of a common lens barrel having a lens system comprised of front and rear lens groups, according to a third embodiment of the present invention.
Figure 12:
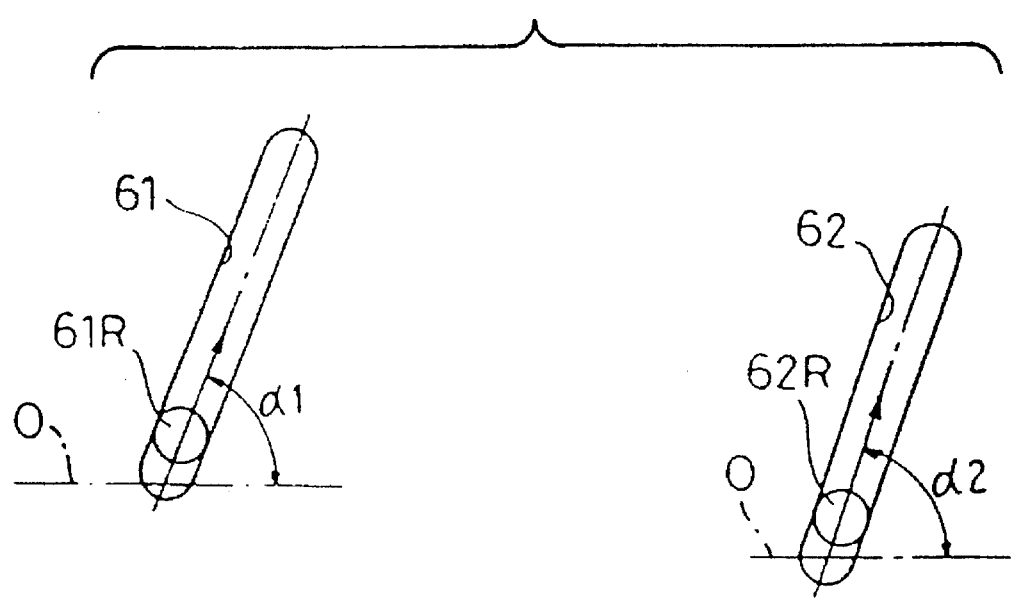
FIG. 12 is a schematic view of profiles of cam grooves in the common lens barrel shown in FIG. 11, by way of example.

FIGS. 11 and 12 shows a third embodiment of the present invention. The first and second lens groups L1 and L2 are secured to the first and second lens frames 11 and 12, respectively. The first and second lens frames 11 and 12 are fitted in the connecting ring (i.e., linear movement transmitting ring) 15 so as to linearly move in the optical axis direction. The connecting ring 15 is provided with an elongated hole 15c extending in parallel with the optical axis, in which the guide pin 16d provided on the lens mount (i.e., ring) 16 is fitted, so that the connecting ring 15 can move only in the optical axis direction.

The connecting ring 15 is also provided with cam grooves (i.e., lead grooves) 61 and 62 for the first and second lens groups L1 and L2. Rollers (i.e., cam followers) 61R and 62R secured to the first and second lens frames 11 and 12 are fitted in the respective cam grooves 61 and 62.

The focusing ring 18 is threadedly-engaged by the outer peripheral surface of the rear end of the connecting ring 15 and the inner peripheral surface of the front end of the lens mount 16 through the threaded portions 15s and 15t, respectively. Consequently, when the focusing ring 18 is rotated, the connecting ring 15, and accordingly the first and second lens frames 11 and 12 (i.e., first and second lens groups L1 and L2), are moved in the optical axis direction without changing the distance therebetween. The switching ring 24 is rotatably fitted on the connecting ring 15 and in front of the focusing ring 18 so as not to move in a relative manner in the axial direction. The connecting ring 24 is provided on the inner peripheral surface thereof with axially extending linear grooves 24e and 24d in which cam pins 61P and 62P coaxial to the rollers 61R and 62R are fitted. The cam grooves 61 and 62 have profiles of predetermined shapes so that they are not parallel with each other. Namely, the angles α1 and α2 of the cam grooves 61 and 62 with respect to the direction O, which is parallel with the optical axis are different from each other. Consequently, when the rotation of the switching ring 24 takes place, the first and second lens frames 11 and 12 (i.e., first and second lens groups L1 and L2) move in the optical axis direction along the cam profiles of the cam grooves 61 and 62, while rotating to change the distance therebetween. The developed view of the switching ring 24 and the surroundings thereof is the same as FIG. 3. The cam profiles of the cam grooves 61 and 62 are determined depending on the monochrome TV camera body and the two color TV camera bodies (corresponding to the color TV modes A and B). Note that the numeral 63 designates the decorative ring secured to the front end of the connecting ring 15.

Figure 13:
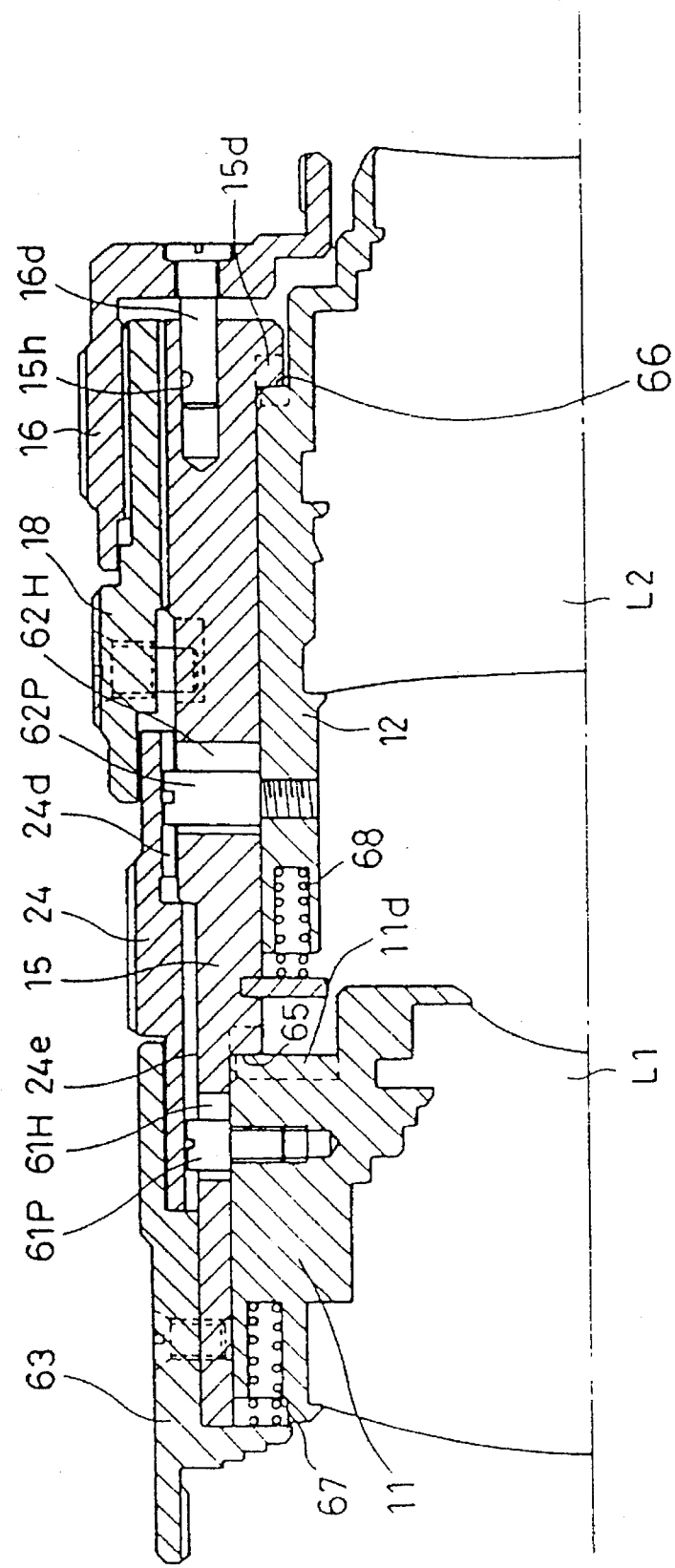
FIG. 13 is a longitudinal sectional view of an upper half of a common lens barrel applied to a lens system comprised of front and rear lens groups, according to a fourth embodiment of the present invention.
Figure 14:
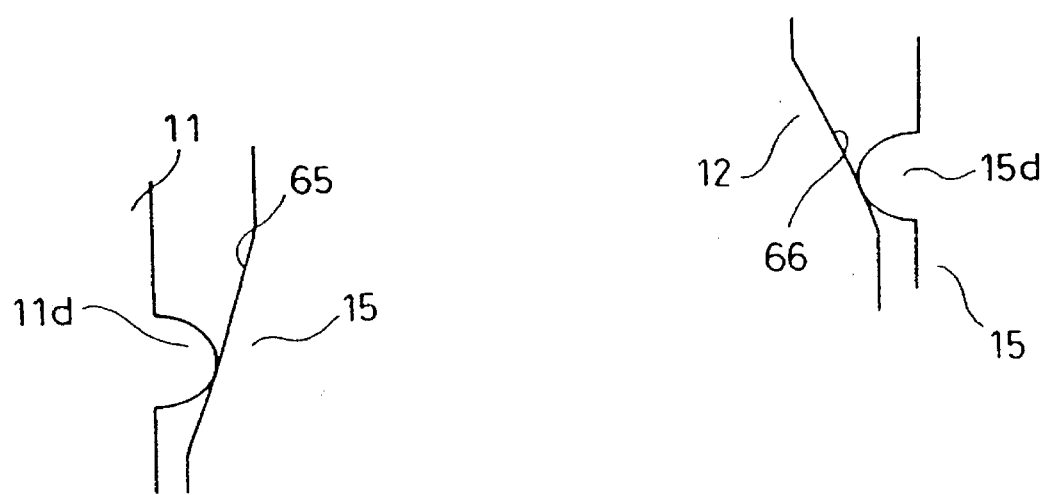
FIG. 14 is a schematic view of profiles of cam grooves in the common lens barrel shown in FIG. 13, by way of example.

FIGS. 13 and 14 show a fourth embodiment of the present invention, in which the cam grooves 61 and 62 shown in FIGS. 11 and 12 are replaced with end surface cams 65 and 66, respectively. The first surface cam 65 is formed on the connecting ring 15 to face the front side, and the second surface cam 66 is formed on the second lens frame 12 to face the rear side. As seen in FIG. 14, a projection 11d formed integrally with the first lens frame 11 abuts against the first surface cam 65, and a projection 15d formed integrally with the connecting ring 15 abuts against the second surface cam 66, respectively. The projection 11d and the projection 15d are continuously pressed against the surface cams 65 and 66 by compression springs 67 and 68, respectively. The connecting ring 15 is provided with through holes 61H and 62H (instead of the cam grooves 61 and 62) through which the corresponding cam pins 61P and 62P loosely extend. The other structure of the arrangement shown in FIGS. 13 and 14 is the same as that of FIGS. 11 and 12. In FIGS. 13 and 14, the components corresponding to those in FIGS. 11 and 12 are designated with like numerals. Accordingly, no detailed explanation therefor will be given hereinafter.

In the above mentioned embodiment, the surface cam 65 and the projection 11d are provided on the connecting ring 15 and the first lens frame 11, respectively. However, the relationship between the projection and the surface cam could be reverse. For example, a surface cam and a projection which correspond to the surface cam 65 and the projection 11d could be provided on the first lens frame 11 and the connecting ring 15, respectively.

Figure 15:
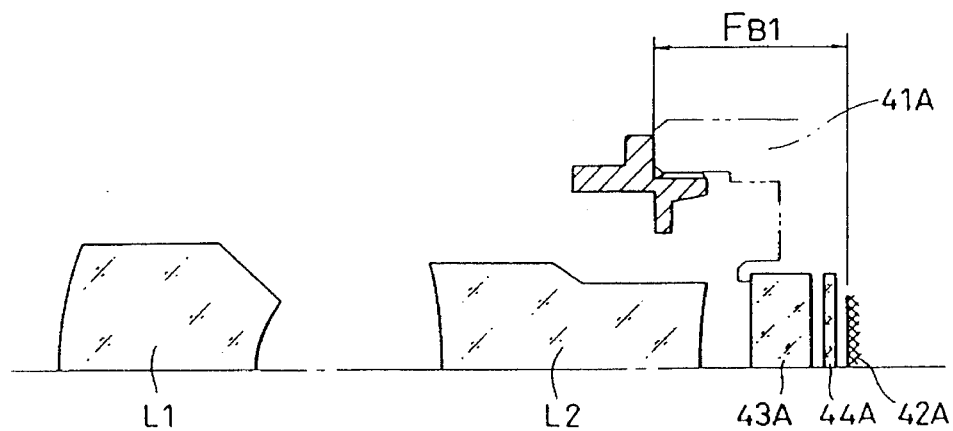
FIG. 15 is a schematic view of an upper half of an optical system of the common lens barrel shown in FIG. 11 or 13, attached to a color TV camera body (A) when a switching means is switched to a color TV position (A)
Figure 16:
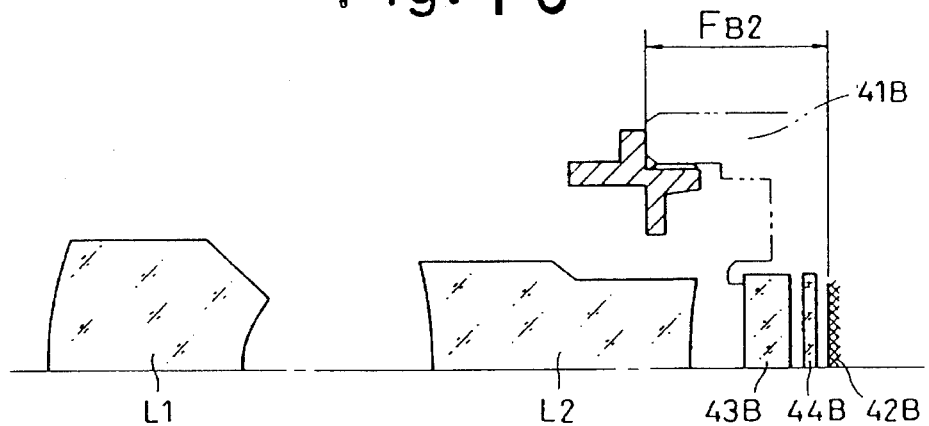
FIG. 16 is a schematic view of an upper half of an optical system of a common lens barrel shown in FIG. 11 or 13, attached to a color TV camera body (B) when a switching means is switched to a color TV position (B)
Figure 17:
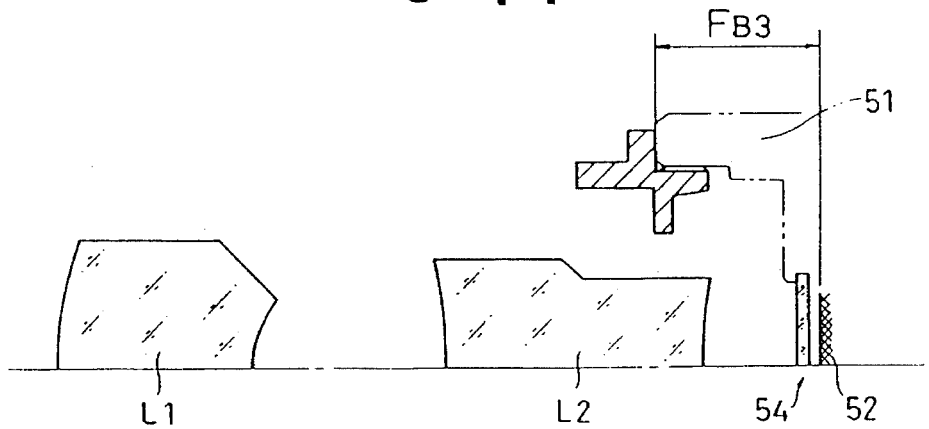
FIG. 17 is a schematic view of an upper half of an optical system of a common lens barrel shown in FIG. 11 or 13, attached to a monochrome TV camera body when a switching means is actuated.

FIGS. 15, 16 and 17 show the common lens barrel attached to the color TV camera body 41A (corresponding to the color TV mode A), the color TV camera body 41B (corresponding to the color TV mode B) and the monochrome TV camera body 51, respectively. The flange-focal distances $F_{B1}$, $F_{B2}$, and $F_{B3}$ of the color TV camera body 41A, the color TV camera body 41B, and the monochrome TV camera body 51 are illustrated in FIGS. 15, 16 and 17 respectively; the values of $F_{B1}$, $F_{B2}$, and $F_{B3}$ satisfy the relationship of $F_{B1}>F_{B2}>F_{B3}$. The resultant thickness of the low-pass filter 43A and the glass cover 44A of the color TV camera body 41A is 6 mm; the resultant thickness of the low-pass filter 43B and the glass cover 44B of the color TV camera body 41B is 5 mm; and the thickness of the glass cover 54 of the monochrome TV camera body 51 is 1 mm, respectively.

As can be seen from the above discussion, according to the present invention, when the common lens barrel is selectively attached to any one of the different kinds of TV camera bodies, the distance between the first and second lens groups L1 and L2 is adjusted by the rotation of the switching ring 24 to thereby compensation of the aberrations depending on the TV camera bodies, so that an optimal flange-focal distance for the selected TV camera body can be obtained.

In the illustrated embodiment, to switch the state shown in FIG. 15 to the state shown in FIG. 16, the first lens group L1 and the second lens group L2 are moved rearwardly by 0.494 mm and 0.314 mm, respectively by the switching ring 24, so that flange-focal distance is changed from $F_{B1}$ to $F_{B2}$ thereby compensating for abberations. Similarly, to switch the state shown in FIG. 16 to the state shown in FIG. 17, the first lens group L1 and the second lens group L2 are moved further rearward by 1.976 mm and 1.256 mm, respectively by the switching ring 24, so that flange-focal distance is changed from $F_{B2}$ to $F_{B3}$ thereby compensating for abberations. Focusing is done by rotating the focusing ring to move the whole lens system in an optical axis direction.

Figure 18:
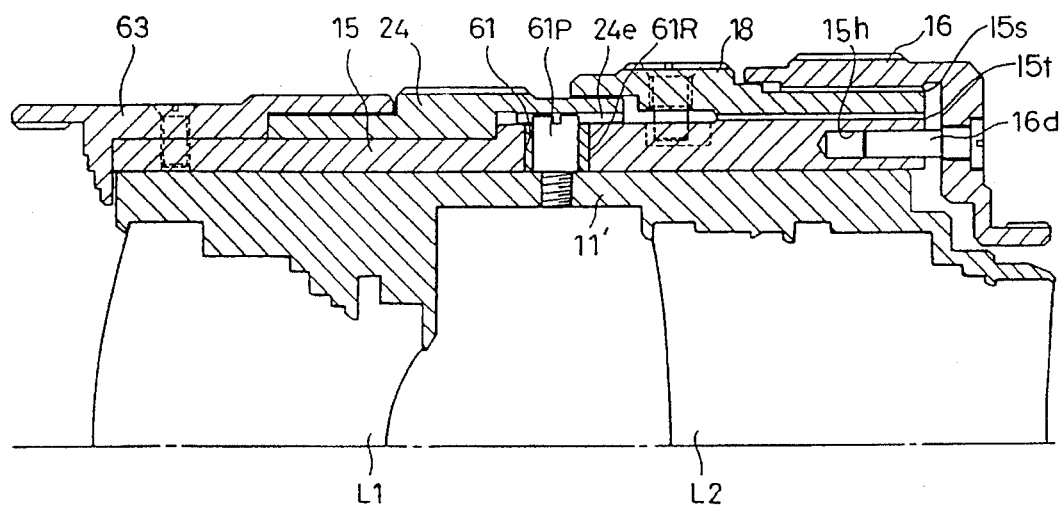
FIG. 18 is a longitudinal sectional view of an upper half of a common lens barrel having a lens system comprised of front and rear lens groups, according to a fifth embodiment of the present invention.
Figure 19:
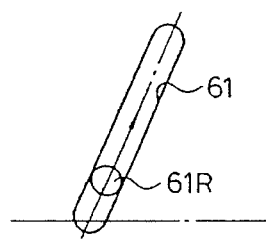
FIG. 19 is a schematic view of a profile of a cam groove in a common lens barrel shown in FIG. 18, by way of example.

FIGS. 18 and 19 show a fifth embodiment of the present invention, in which the first and second lens groups L1 and L2 are moved together without changing the distance therebetween, unlike the previous embodiments shown in FIGS. 11 through 17 in which the distance between the first and second lens groups L1 and L2 is changed to compensate for the aberrations in accordance with the two kinds of color TV camera bodies and the monochrome TV camera body. Furthermore, in the fifth embodiment illustrated in FIGS. 18 and 19, the entirety of the first and second lens groups L1 and L2 is moved in the optical axis direction by a focusing means to effect the focusing operation.

The first and second lens group L1 and L2 are secured to a single lens frame 11' which is provided with a radially projecting cam pin 61P. The connecting ring 15 is provided with a cam groove 61 in which the roller (i.e., cam follower) 61R fitted on the cam pin 61P is fitted. The cam pin 61P is fitted in the axially extending linear groove 24e formed on the inner surface of the switching ring 24, so that when the switching ring 24 is rotated, the lens frame 11' is moved in the optical axis direction in accordance with the cam profile of the cam groove 61 while rotating. As a result, the first and second lens groups L1 and L2 are moved in the optical axis direction without changing the distance therebetween. Moreover, when the focusing ring 18 is rotated, the connecting ring 15 is moved in the optical axis direction through the threaded portions 15s and 15t. Consequently, the first and second lens groups L1 and L2 are moved in the optical axis direction without changing the distance therebetween.

Figure 20:
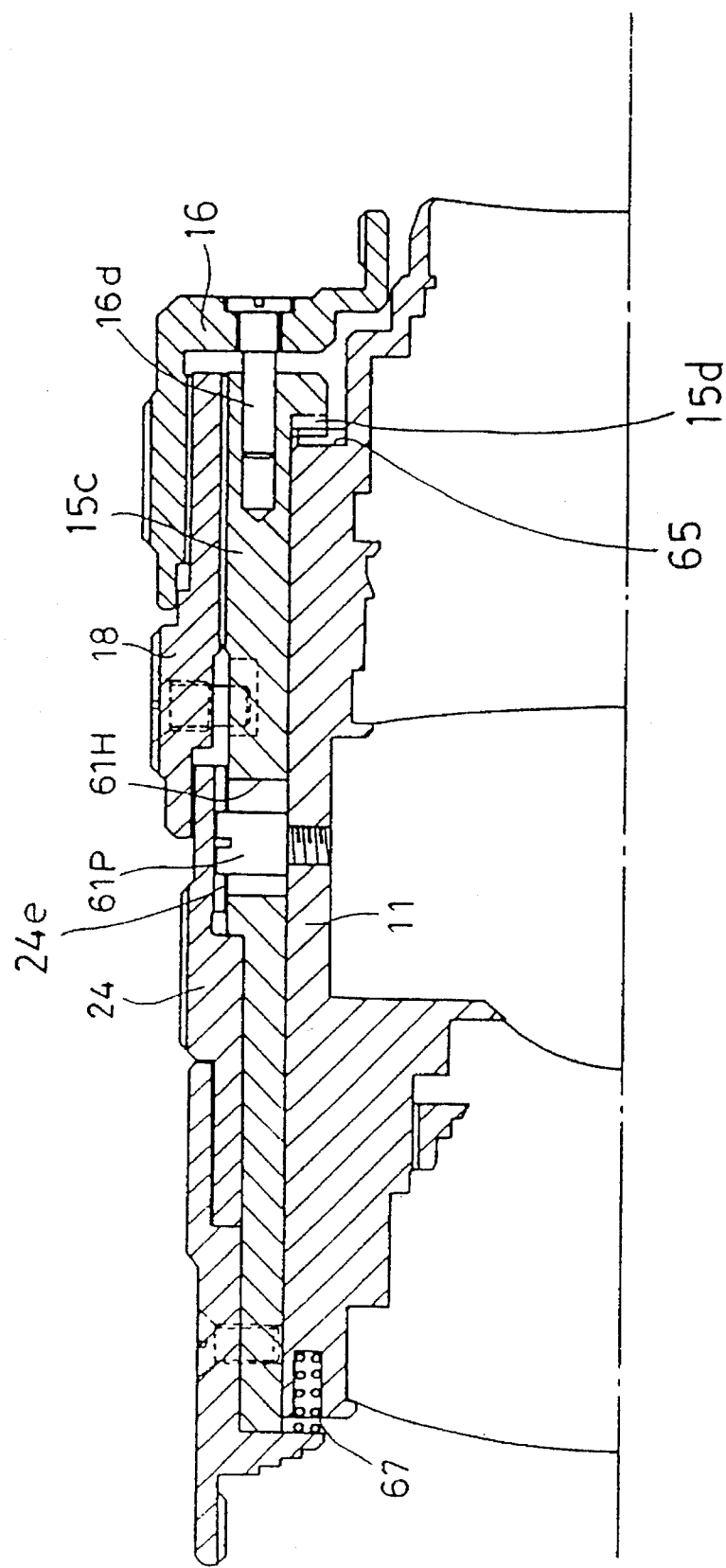
FIG. 20 is a longitudinal sectional view of an upper half of a common lens barrel having a lens system comprised of front and rear lens groups, according to a sixth embodiment of the present invention; and, FIG. 21 is a schematic view of a profile of a cam groove in a common lens barrel shown in FIG. 20, by way of example.
Figure 21:
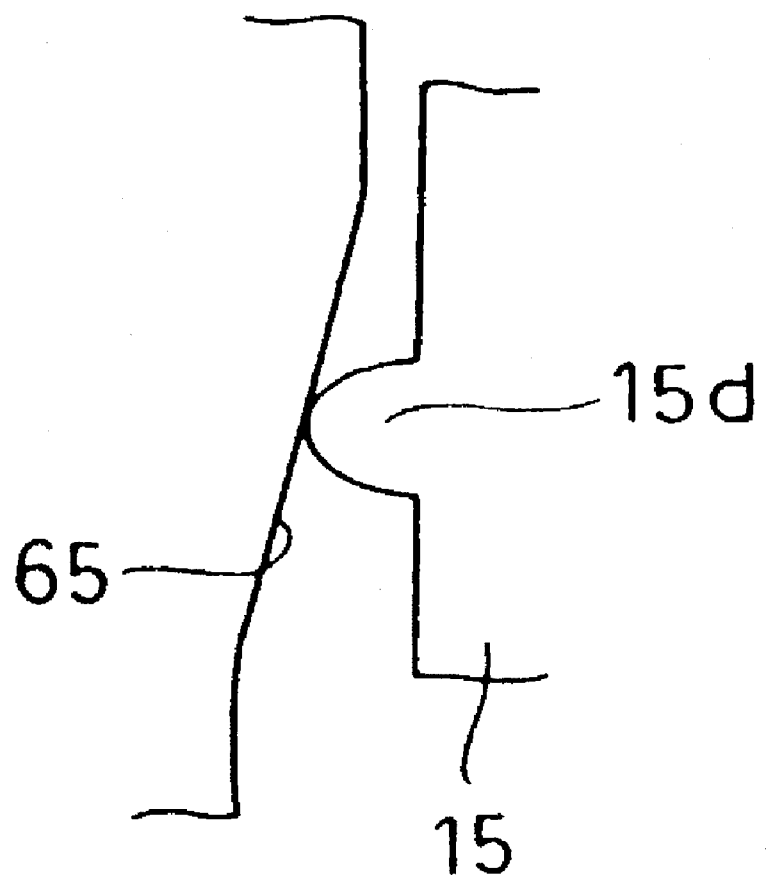

FIGS. 20 and 21 show a sixth embodiment of the present invention, in which the cam groove 61 shown in FIGS. 18 and 19 is replaced with an end surface cam 65. The surface cam 65 is formed on the lens frame 11' to face the rear side. A projection 15d formed integrally with the connecting ring 15 abuts against the surface cam 65. The projection 15d is continuously pressed against the surface cam 65 by a compression spring 67. The connecting ring 15 is provided with a through hole 61H (instead of the cam groove 61) through which the cam pin 61P loosely extends. The other structure of the arrangement shown in FIGS. 20 and 21 is the same as that of FIGS. 18 and 19. In FIGS. 20 and 21, the components corresponding to those in FIGS. 18 and 19 are designated with like numerals. Accordingly, no detailed explanation therefor will be given herein.

It is also true that the relationship between the projection and the surface cam could be reverse in this embodiment, as mentioned above.

As can be seen from the above discussion, according to the fifth and sixth embodiments, the first and second lens groups L1 and L2 are moved in the optical axis direction by the rotation of the switching ring 24 to thereby correct the aberrations in accordance with the TV camera bodies to which the common lens barrel is to be selectively attached. Moreover, the focusing can be appropriately carried out by the rotation of the focusing ring 18 in each TV camera body.

It goes without saying that the present invention is not limited to the illustrated embodiments. The subject of the present invention is not directed to the lens arrangement or lens structure per se. The optimum distance between the lens groups to be adjusted and the position at which the adjustment of the lens distance is to be effected are determined taking into account the aberrations caused depending on the TV camera bodies. Although there are two kinds of color TV camera bodies in the above discussion, the present invention can be applied to a common lens barrel for TV camera bodies having different filters which are located in front of the CCD and have different thicknesses.

The present invention can also be applied to an AF type lens barrel in which the focusing operation is automatically effected by a motor.

As can be understood from the foregoing, in a common lens barrel according to the present invention, a high quality color or monochrome image in which aberrations have been corrected can be obtained in various kinds of TV camera bodies having different thicknesses of filters, regardless of the kind or type of image to be formed.

I claim:

1. A common lens barrel which can be detachably attached to a plurality of TV camera bodies, each of the plurality of TV camera bodies having at least one filter provided in front of the image pickup device, the filters of the respective camera bodies having different thicknesses, and the common lens barrel having a plurality of lens groups, the common lens barrel comprising:

focusing means for focusing an image formed by said plurality of lens groups; and switching means for varying a distance between specific lens groups of the plurality of lens groups in accordance with the thickness of the filter of the camera body to which the common lens barrel is attached.

2. The common lens barrel of claim 1, the plurality of lens groups comprising a first lens group, a second lens group and a third lens group.

3. The common lens barrel of claim 2, said focusing means moving the entirety of said first, second and third lens groups in an optical axis direction of the lens groups.

4. The common lens barrel of claim 2, the plurality of TV camera bodies comprising a monochrome TV camera body and a color TV camera body, said switching means moving said first and second lens groups in unison further towards said third lens group when the common lens barrel is attached to said color TV camera body than when the common lens barrel is attached to said monochrome TV camera body.

5. The common lens barrel of claim 3, said switching means moving said first and second lens groups together with respect to said third lens group.

6. The common lens barrel of claim 3, said switching means varying the distance between said first and second lens groups and the distance between said second and third lens groups.

7. The common lens barrel of claim 6, the plurality of TV camera bodies comprising a monochrome TV camera body and a color TV camera body, said switching means moving said first lens group further towards said second lens group when the common lens barrel is attached to said monochrome TV camera body than when the common lens barrel is attached to said color TV camera body, said switching means moving said second lens group further toward said third lens group when the common lens barrel is attached to said color TV camera body than when the common lens barrel is attached to said monochrome TV camera body.

8. The common lens barrel of claim 7, a displacement of said first lens group towards said second lens group being larger than a displacement of said second lens group towards said third lens group.

9. The common leans barrel of claim 1, the plurality of lens groups comprising a front lens group and a rear lens group.

10. The common lens barrel of claim 9, said focusing means moving said front and rear lens groups in an optical axis direction of the lens groups in unison.

11. The common lens barrel of claim 10, said switching means individually moving said front lens group and said rear lens group along predetermined loci.

12. A common lens barrel which can be detachably attached to a plurality of TV camera bodies, each of the plurality of TV camera bodies having at least one filter provided in front of an image pickup device, the filters of the respective camera bodies having different thicknesses, and the common lens barrel having a plurality of lens groups, the common lens barrel comprising:

focusing means for focusing an image formed by said plurality of lens groups of said common lens barrel; and switching means for moving the plurality of the lens groups to predetermined positions in an optical axis direction of the lens groups in accordance with the thickness of the filter of the camera body to which the common lens barrel is attached, independently of said focusing means.

13. A common lens barrel which can be detachably attached to a plurality of TV camera bodies, each of the plurality of TV camera bodies having at least one filter provided in front of an image pickup device, the filters of the respective camera bodies having different thicknesses, and the common lens barrel comprising a plurality of lens groups, the common lens barrel comprising a switching mechanism for varying the distance between specific lens groups of the plurality of lens groups in accordance with the thickness of the filter of the camera body to which the common lens barrel is attached.

14. The common lens barrel according to claim 13, further comprising a focusing mechanism for moving said plurality of lens groups in an optical axis direction of the lens groups to focus an image formed by said plurality of lens groups.

15. The common lens barrel according to claim 13, said plurality of lens groups comprising a first lens group, a second lens group, and a third lens group, said plurality of TV camera bodies comprising a monochrome TV camera body and a color TV camera body, said switching mechanism moving said first and second lens groups further toward said third lens group when said common lens barrel is attached to said color TV camera body than when said common lens barrel is attached to said monochrome TV camera body.

16. The common lens barrel of claim 13, said switching mechanism individually moving said specific lens groups of said plurality of lens groups along predetermined loci.

17. The common lens barrel according to claim 13, further comprising a focusing mechanism for focusing an image formed by said plurality of lens groups, said switching mechanism moving said plurality of lens groups independently of said focusing mechanism.

* * * * *